United States Patent Office

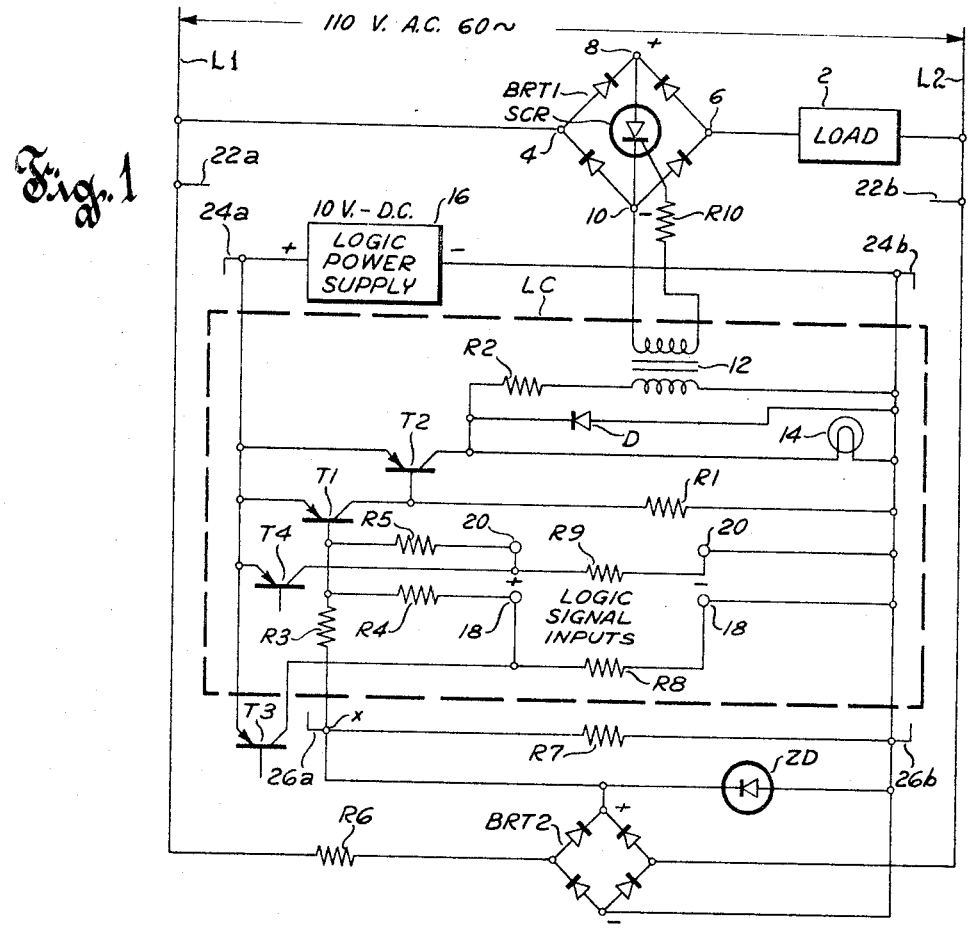
Fig. 1
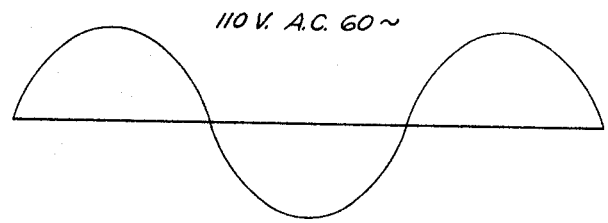
Fig. 2a
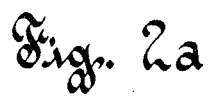
Fig. 2b
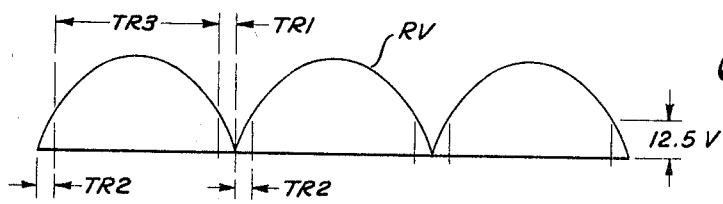
BRIDGE OUTPUT OF BRT2

3,272,991
Patented Sept. 13, 1966

3,272,991
STATIC SWITCH
Gene C. Lutsch, Hales Corners, and Carl J. Weiss, Milwaukee, Wis., assignors to Cutler-Hammer, Inc., Milwaukee, Wis., a corporation of Delaware
Filed Nov. 23, 1962, Ser. No. 239,693
7 Claims. (Cl. 307—88.5)

This invention relates to static switches and more particularly to switching circuits of the solid element semiconductor type.

While not limited thereto, the invention is especially applicable to control a high power load circuit by low power input control means.

An object of the invention is to provide improved static switching means.

A more specific object of the invention is to provide improved means for controlling high power to a load device by low power logic input signals.

Another specific object of the invention is to provide completely static means for controlling switching of high power to a load device by a plurality of low power concurrent input signals.

A further object of the invention is to provide such switching means which is simple in construction and reliable in operation.

Other objects and advantages of the invention will hereinafter appear.

According to the invention, there is provided a static circuit for controlling final switching of electrical power to a high power load device such as a solenoid, large electromagnetic contactor or the like. Such load, for example, may be supplied from a 110 volt alternating current power supply source or a source of higher voltage. For selectively connecting the source to the load device, there is provided rectifier means and a solid element gating device such as a silicon controlled-rectifier. For controlling gating of the controlled rectifier for maximum conduction, there is provided a static logic circuit requiring very low input signal power relative to the power that is switched. The logic circuit preferably takes the form of an AND circuit requiring simultaneous application of at least two input signals for operation thereof or application of a synchronizing signal and simultaneous application of at least two other signals thereto for operation thereof.

These and other objects and advantages of the invention and the manner of obtaining them will best be understood by reference to the following detailed description of an embodiment thereof taken in conjunction with the accompanying drawings, wherein;

FIGURE 1 diagrammatically shows a static switching circuit constructed in accordance with the invention; and FIGS. 2a and 2b graphically show operating characteristics of the circuit of FIG. 1.

Referring to FIG. 1, there is shown static means for switching power to a load device 2. This means comprises a full-wave rectifier bridge BRT1 and a silicon controlled rectifier SCR. The input terminals 4 and 6 of the bridge are connected to power supply line L1 and one side of load 2, respectively, whereas the other side of the load is connected to power supply line L2. The positive and negative output terminals of the bridge are connected to the anode and cathode, respectively, of controlled rectifier SCR. By this arrangement, a single controlled rectifier in the direct current portion of the circuit controls a load device in the alternating current portion of the circuit. It will be apparent that this arrangement could alternatively be employed to control a direct current load device connected in a direct current portion of the circuit, for example, between terminal 8 of the bridge and the anode.

FIG. 1 also shows static means for controlling firing or "gating" of the controlled rectifier in response to input signals. This means comprises a logic circuit LC enclosed in broken lines, synchronizing control means for the logic circuit and at least two input signal means for the logic circuit. Logic circuit LC comprises a pair of static devices such as transistors T1 and T2 preferably of the P-N-P conductivity type, a load resistor R1 for transistor T1, an output transformer 12 for transistor T2, a discharge diode D and a resistor R2 for the primary winding of transformer 12, an indicator lamp 14, a synchronizing control resistor R3 and logic input signal resistors R4 and R5. A direct current power supply source 16 is provided for supplying operating voltage to logic circuit LC.

The aforementioned synchronizing control means comprises a current control resistor R6 and a full-wave rectifier bridge BRT2 connected in series across power supply lines L1 and L2, a voltage limiting zener diode ZD connected across the positive and negative output terminals of bridge BRT2 and a resistor R7 of relatively large value providing a current path in shunt of diode ZD.

The aforementioned input signal means for the logic circuit comprise a first pair of input terminals 18 connected to resistor R4 and the negative side of supply 16 and a second pair of input terminals 20 connected to resistor R5 and the negative side of supply 16. While means for applying a direct current input signal voltage to each pair of input terminals 18 and 20 may take various forms, for exemplary purposes, this means is shown as comprising a transistor of the P-N-P conductivity type and a load resistor therefor. As shown in FIG. 1, the emitter of a transistor T3 is connected to the positive side of supply 16 and the collector thereof is connected to resistor R8, the opposite ends of the latter being connected to the respective input terminals of pair 18 thereof. As will be apparent, when transistor T3 is rendered conducting, the voltage drop across resistor R8 is applied to input terminals 18 as a direct current logic input signal. Similar means comprising transistor T4 and resistor R9 may be employed for applying input signals to input terminals 20.

Transformer 12 is the output transformer of the logic circuit. The primary winding of this transformer is connected in series with resistor R2 in the collector circuit of transistor T2. The secondary winding of the transformer has one end connected through a current limiting resistor R10 to the gate of controlled rectifier SCR and has its other end connected to the cathode thereof whereby firing voltage or current is applied to the controlled rectifier.

As shown in FIG. 1 by multiple conductor pairs 22a–b, 24a–b and 26a–b, the circuit can be adapted for control of a plurality of load devices with certain elements being employed in common thereto. Supply lines L1 and L2, logic power supply 16 and the synchronizing control means can be employed in common for a plurality of load devices. The remaining elements shown in FIG. 1 would be duplicated for each additional load device to be controlled.

The operation of the system of FIG. 1 will now be described with reference to the curves in FIGS. 2a–b.

When the power supplies are connected, current flows from line L1 through resistor R6, bridge BRT2 and resistor R7 to line L2 on alternate half-cycles of the alternating supply voltage. On the other half-cycles, current flows from line L2 through bridge BRT2 and resistors R7 and R6 to line L1. This full-wave rectified current flow through resistor R7 applies positive voltage half-cycles at point X of the circuit. The voltage drop across resistor R7 is limited by zener diode ZD. That is, a zener diode is employed having characteristics such that the voltage at point X is 10 volts positive when the A.C. line voltage is at 12.5 volts or higher.

Current flows from source 16 through the emitter-base junction of transistor T1 and in one path through resistors R4 and R8 and in another parallel path through resistors R5 and R9. This current flow maintains transistor T1 conducting in its emitter-collector junction whereby current flows therethrough and through resistor R1.

When transistor T1 is rendered conducting, the impedance thereacross drops to substantially zero value. As a result, a positive voltage of like magnitude is applied through the emitter-collector junction of transistor T1 to the base of transistor T2 as is applied from source 16 to the emitter thereof to maintain transistor T2 non-conducting. Therefore, no output voltage is derived from transformer 12 of the logic circuit and the load device remains deenergized.

To energize load device 2, it is necessary to apply logic input signal voltages to input terminals 18 and 20. This may be done by rendering transistors T3 and T4 conducting. If a negative voltage is applied from source 16 to the base of transistor T3, that is, a voltage that is less positive than the 10 volts being applied from source 16 to the emitter thereof, transistor T3 is rendered conducting. Current flows through the emitter-collector junction thereof and resistor R8. As the impedance of transistor T3 when conducting is substantially zero, a drop of 10 volts appears across resistor R8. Let it be assumed that resistors R3 and R4 have equal resistance values. Since 10 volt positive is being applied to point X, the application of 10 volts to input terminals 18 of the polarity indicated thereat prevents any current flow through resistors R3 and R4. However, current can still flow through the emitter-base junction of transistor T1 and resistors R5 and R9 so long as an input signal voltage is not applied to input terminals 20. If transistor T4 is rendered conducting in the manner of transistor T3 whereby an input signal of 10 volts is applied to input terminals 20, the base voltage of transistor T1 will be raised to 10 volts to terminate conduction therethrough. In like manner, if an input signal voltage is applied only to input terminals 20, transistor T1 base current can still flow through resistors R4 and R8 to maintain transistor T1 conducting. Signals must be applied to both pairs of input terminals to stop transistor T1 from conducting. During the times that point X is at less than 10 volts, transistor T1 base current flows through resistors R3 and R7 to maintain transistor T1 conducting even if input signals are applied to both pairs of terminals 18 and 20.

When the input signals stop transistor T1 from conducting, base current flows in transistor T2 to render the latter conducting. This current flows through the emitter-base junction of transistor T2 and resistor R1. As a result, transistor T2 conducts current through its emitter-collector junction, resistor R2 and the primary winding of transformer 12. As this current in the primary winding increases in value, an induced current pulse flows from the secondary winding of transformer 12 through resistor R10 and the gate and cathode of controlled rectifier SCR to fire the latter in a manner hereinafter more fully described. Current also flows through the emitter-collector junction of transistor T2 and lamp 14 to energize the latter to indicate that the load device is energized.

The manner in which controlled rectifier SCR is fired is illustrated in FIG. 2b. FIG. 2a shows the sine voltage wave of the alternating current source appearing across lines L1 and L2. This voltage is rectified in bridge BRT1 as indicated by curve RV in FIG. 2b and applied to the anode of controlled rectifier SCR. This A.C. voltage is also rectified in bridge BRT2 and its amplitude is clipped by zener diode ZD to apply half-cycle voltage waves to point X which are in synchronism with the positive half-cycles RV applied to the anode of controlled rectifier SCR.

Referring again to FIG. 1, it will be apparent that application of only the logic input signals will not cause energization of the load device. If these two signals alone are applied, current will flow through the emitter-base junction of transistor T1 and resistors R3 and R7. This will cause transistor T1 to remain conducting and to maintain transistor T2 non-conducting and the load device deenergized. It is only when a synchronized signal of at least 10 volts is also applied to point X from bridge BRT2 that transistor T1 can be rendered non-conducting. Therefore, during the times that the voltage at point X is less than 10 volts positive, transistor T1 will conduct and transistor T2 will not conduct and the load will not energize.

Referring to FIG. 2b, during the time intervals TR2, the line voltage is less than 12.5 volts and the voltage at point X is less than 10 volts. Consequently, transistor T2 remains non-conducting. At the start of the time intervals TR3 when the voltage at point X reaches 10 volts, transistor T1 is rendered non-conducting. This causes transistor T2 to conduct and a firing pulse is applied from transformer 12 to the gate of controlled rectifier SCR to render the latter conducting. The controlled rectifier then continues to conduct for the remainder of the half-cycle of its anode voltage although its gate current pulse has ended. At the end of time intervals TR3 when the voltage at point X falls below 10 volts, transistor T1 resumes conduction and resets transistor T2 to its non-conducting condition. However, the controlled rectifier continues to conduct through time intervals TR1. During time intervals TR1 and TR2, the magnetic flux in transformer 12 is resetting.

While cerain voltage values have hereinbefore been described for exemplary purposes, it will be apparent that other values might be employed depending upon the characteristics of the components elements used in a particular circuit.

While certain voltage values have hereinbefore been desadapted to fulfill the objects stated, it is to be understood that we do not intend to confine our invention to the particular preferred embodiment of static switch disclosed, inasmuch as it is susceptible of various modifications without departing from the scope of the appended claims.

We claim:

1. In a static switching system for energizing a load, in combination:
   (a) an A.C. power supply source;
   (b) means comprising a solid element gating device operable when firing voltage is applied to the gate of said solid element gating device for causing current flow from said source to the load during half-cycles of supply voltage applied thereto from said source;
   (c) an AND logic circuit requiring a synchronizing voltage and at least two input voltages to afford firing voltage to said gate, said synchronizing voltage having half-cycles in phase with said half-cycles of supply voltage applied to said device for synchronizing the firing voltage with the latter voltage, and the input voltages being D.C. voltages:
   (d) input circuit means for applying to said logic circuit said D.C. input voltages and output circuit means for applying firing voltage from said logic circuit to the gate of said solid element gating device;
   (e) circuit means connected to said source for applying to said logic circuit said synchronizing voltage;
   (f) means effective when either of said D.C. input voltages is not being applied to said logic circuit for rendering the latter unresponsive to said synchronizing input voltage;
   (g) and means in said logic circuit responsive to concurrent application thereto of said D.C. input voltages and said synchronizing voltage for rendering said logic circuit operative to apply a firing voltage to said gate of said solid element gating device.

2. In a static switching system for energizing a load, in combination:
   (a) an A.C. power supply source;
   (b) means comprising a controlled rectifier operable when firing voltage is applied to the gate of said controlled rectifier for causing current flow from said source to the load during half-cycles of forward anode voltage applied thereto from said source;
   (c) an AND logic circuit requiring a synchronizing voltage and at least two input voltages to afford firing voltage to said controlled rectifier gate, said synchronizing voltage having half-cycles in phase with said half-cycles of forward anode voltage for synchronizing the firing voltage with the latter, and the input voltages being D.C. voltages;
   (d) input circuit means for applying to said logic circuit said D.C. input voltages and output circuit means for applying firing voltage from said logic circuit to the gate of said controlled rectifier;
   (e) circuit means connected to said source for applying to said logic circuit said synchronizing voltage;
   (f) means effective when the magnitude of said synchronizing voltage is less than a predetermined value for rendering said logic circuit unresponsive to said D.C. input voltages;
   (g) and means in said logic circuit responsive to concurrent applications thereto of said D.C. input voltages and said synchronizing voltage of said predetermined value for rendering said logic circuit operative to apply said firing voltage to said controlled rectifier gate.

3. In a static switching system for controlling energization of a load device, in combination:
   (a) an A.C. power supply source;
   (b) means comprising a controlled rectifier operable when firing pulses are applied to the gate thereof during half-cycles of forward anode voltage being applied thereto for causing current flow from said source to the load device during the remaining portions of such half-cycles;
   (c) an AND logic circuit requiring a control voltage and two input voltages to afford such firing pulses to said controlled rectifier gate, said control voltage having half-cycles in phase with said half-cycles of forward anode voltage for synchronizing said firing pulses with the latter, and the input voltages being D.C. voltages;
   (d) input circuit means for applying to said logic circuit said D.C. input voltages and output circuit means for applying firing pulses from said logic circuit to the gate of said controlled rectifier;
   (e) circuit means connected to said source for applying to said logic circuit said control voltage;
   (f) means effective when either of said D.C. input voltages is not being applied to said logic circuit for rendering the latter unresponsive to said control voltage;
   (g) means effective when said control voltage is not being applied to said logic circuit for rendering the latter unresponsive to said D.C. input voltages;
   (h) and the two last mentioned means comprising means responsive to concurrent application to said logic circuit of said D.C. input voltages and said control voltage for rendering said logic circuit operative to apply said firing voltages to said controlled rectifier gate.

4. The invention defined in claim 3, wherein said control voltage applying circuit means comprises means for limiting the magnitude of said control voltage to a value equal to the magnitude of each said D.C. input voltage.

5. In a static switching system for energizing a load device, in combination:
   (a) an A.C. power supply source;
   (b) a controlled rectifier;
   (c) means comprising rectifier means connecting said source to said controlled rectifier and to said load device whereby said controlled rectifier controls current flow to the load device;
   (d) and means for controlling said controlled rectifier to render it conducting comprising;
   (e) a first transistor and a second transistor;
   (f) means comprising a D.C. power supply source and circuit means for supplying operating voltage to said transistors and for supplying control voltage to said first transistors normally to render the latter conducting;
   (g) means connecting said first transistor to said second transistor whereby conduction in said first transistor renders said second transistor non-conducting and non-conduction in said first transistor renders said second transistor conducting;
   (h) and means for applying to said first transistor a synchronizing voltage and two input voltages all of which must be applied thereto to render it non-conducting comprising;
   (i) means comprising rectifier means connected to said A.C. source for applying to said first transistor a voltage synchronized with the voltage applied from said A.C. source to said controlled rectifier;
   (j) and means for applying to said first transistor two D.C. input voltages which together with said synchronized voltage renders said first transistor non-conducting thereby to render said second transistor conducting;
   (k) and means connected to said second transistor for applying a firing voltage pulse to said controlled rectifier to render the latter conducting and to energize the load device.

6. The invention defined in claim 5, wherein said means for applying to said first transistor a synchronizing voltage and two input voltages comprises;
   (a) means effective when said synchronizing voltage has a magnitude less than the magnitude of each input voltage for rendering said first transistor unresponsive to said D.C. input voltages whereby said first transistor remains conducting;
   (b) and means effective when either of said D.C. input voltages is not being applied thereto for rendering said first transistor unresponsive to said synchronized input voltage and other input voltage whereby said first transistor remains conducting.

7. The invention defined in claim 5, wherein:
   (a) said synchronizing voltage applying means comprises a circuit allowing current flow from said D.C. source through the emitter-base junction of said first transistor when said synchronizing voltage has a value less than the value of each input voltage;
   (b) and said D.C. input voltage applying means comprises a circuit allowing current flow from said D.C. source through the emitter-base junction of said first transistor when one of said D.C. input voltages is not being applied to said first transistor.

References Cited by the Examiner
UNITED STATES PATENTS 3,161,759   12/1964   Gambill _____ 219—494
3,176,212   3/1965    De Puy _____ 321—8

JOHN F. COUCH, *Primary Examiner.*

MILTON O. HIRSHFIELD, *Examiner.*

K. D. MOORE, *Assistant Examiner.*